(12) United States Patent
Wisnudel et al.

(10) Patent No.: US 7,802,274 B2
(45) Date of Patent: Sep. 21, 2010

(54) OPTICAL DATA STORAGE ARTICLE HAVING A PHYSICAL SURFACE MODIFICATION AS AN ANTI-THEFT FEATURE AND A SYSTEM AND METHOD FOR INHIBITING THEFT OF SAME

(75) Inventors: Marc Brian Wisnudel, Clifton Park, NY (US); Ben Purushotam Patel, Niskayuna, NY (US); Kasiraman Krishnan, Clifton Park, NY (US); Lifeng Zhang, Clifton Park, NY (US); Matthew Jeremiah Misner, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 485 days.

(21) Appl. No.: 11/611,368

(22) Filed: Dec. 15, 2006

(65) Prior Publication Data

US 2007/0141293 A1    Jun. 21, 2007

Related U.S. Application Data

(63) Continuation-in-part of application No. 11/286,413, filed on Nov. 21, 2005, now Pat. No. 7,653,919.

(51) Int. Cl.
*G11B 3/70* (2006.01)
*G11B 7/252* (2006.01)

(52) U.S. Cl. .................. 720/718; 369/273; 369/15; 340/572.1

(58) Field of Classification Search .......... 369/275.4, 369/275.5, 283, 288, 273, 15; 206/308.1; 720/718, 719, 728, 745; 340/572.1
See application file for complete search history.

(56) References Cited

U.S. PATENT DOCUMENTS

| | | | | |
|---|---|---|---|---|
| 6,338,933 | B1 * | 1/2002 | Lawandy et al. | 430/270.1 |
| 6,434,109 | B2 * | 8/2002 | Rollhaus et al. | 369/286 |
| 2002/0076647 | A1 | 6/2002 | Lawandy et al. | |
| 2002/0175818 | A1 * | 11/2002 | King et al. | 340/572.8 |
| 2003/0028787 | A1 * | 2/2003 | Fayed et al. | 713/189 |
| 2003/0085288 | A1 * | 5/2003 | Luu | 235/492 |
| 2004/0022542 | A1 | 2/2004 | Atkinson | |
| 2004/0054594 | A1 | 3/2004 | Forster et al. | |
| 2004/0233042 | A1 * | 11/2004 | Piccoli et al. | 340/10.1 |

(Continued)

FOREIGN PATENT DOCUMENTS

JP    05159365 A    6/1993

(Continued)

OTHER PUBLICATIONS

"Indium Tin Oxide", Wikimedia Foundation, XP002470620, retrieve from the internet, 1 page.

(Continued)

*Primary Examiner*—William J Klimowicz
(74) *Attorney, Agent, or Firm*—Richard A. DeCristofaro

(57) ABSTRACT

An optical data storage article is configured to transform from a pre-activated state of functionality to an activated state of functionality. The optical data storage article includes a physical surface modification configured to alter an optical integrity of the optical data storage article upon interaction with an external stimulus.

30 Claims, 5 Drawing Sheets

U.S. PATENT DOCUMENTS

| | | |
|---|---|---|
| 2006/0114755 A1 | 6/2006 | Eklund, II |
| 2006/0136947 A1* | 6/2006 | LeBlanc et al. .............. 720/619 |
| 2006/0227696 A1* | 10/2006 | Smith et al. .............. 369/275.1 |
| 2007/0115762 A1* | 5/2007 | Wisnudel et al. ......... 369/13.56 |
| 2007/0140072 A1* | 6/2007 | Agrawal et al. ............... 369/14 |
| 2008/0019258 A1* | 1/2008 | Peters et al. ............. 369/275.1 |

FOREIGN PATENT DOCUMENTS

| | | | |
|---|---|---|---|
| JP | 2002025222 A | * | 1/2002 |
| JP | 2005071575 A | * | 3/2005 |
| WO | WO2006011315 A2 | | 10/2006 |
| WO | WO2007061774 A1 | | 3/2007 |
| WO | WO2007061776 A1 | | 3/2007 |
| WO | WO2007059288 A1 | | 5/2007 |
| WO | WO2007061974 A1 | | 5/2008 |

OTHER PUBLICATIONS

PCT International Search Report dated Mar. 6, 2008.

* cited by examiner

OPTICAL DATA STORAGE ARTICLE HAVING A PHYSICAL SURFACE MODIFICATION AS AN ANTI-THEFT FEATURE AND A SYSTEM AND METHOD FOR INHIBITING THEFT OF SAME

The present patent application is a continuation-in-part application from U.S. patent application Ser. No. 11/286,413, filed Nov. 21, 2005, now U.S. Pat. No. 7,653,919 B2, the disclosure of which is hereby incorporated by reference in its entirety.

BACKGROUND

The invention generally relates to an optical data storage article, particularly, the invention relates to an optical data storage article having an anti-theft feature and a method for inhibiting theft of the same.

Shoplifting is a major problem for retail venues and especially for shopping malls, where it is relatively difficult to keep an eye on each customer while he/she shops or moves around in the store. Relatively small objects, such as CDs and DVDs are easy targets as they can be easily hidden and carried out of the store without getting noticed. Stores, as well as the entertainment industry, incur monetary losses because of such instances. Due to the sensitive nature of the information stored inside, this problem becomes more severe if the CDs or DVDs are stolen from places like offices.

Even though close circuit surveillance cameras may be located at such places, shoplifting or stealing still occurs. Consumable products sometimes are equipped with theft-deterrent packaging. For example, clothing, CDs, audio tapes, DVDs and other high-value items sometimes are packaged along with tags that set off an alarm if the item is removed from the store without being purchased. These tags are engineered to detect and alert for shoplifting. For example, tags that are commonly used to secure against shoplifting are the Sensormatic® electronic article surveillance (EAS) tags based on acousto-magnetic technology. RFID tags are also employed to trace the items in store shelves and warehouses. Other theft-deterrent technologies currently used for optical discs include special hub caps for DVD packaging that lock down the DVD and prevent it from being removed from the packaging until the DVD is purchased. Similarly, "keepers" that are attached to the outside of the DVD packaging also prevent the opening of the packaging until the DVD is purchased. In some cases, retailers have resorted to storing merchandise in locked glass display cases. In other stores, the DVD cases on the shelves are empty, and the buyer receives the actual disc when the movie is purchased. Many of these approaches are unappealing in that they add an additional inconvenience to the buyer or store-owner or they are not as effective at preventing theft as desired. Optical articles, in particular, pose an additional problem in that they are very easy to remove from their packaging and the sensor/anti-theft tags may be removed easily.

SUMMARY

Embodiments of the invention are directed to an optical data storage article having an anti-theft feature and a method for inhibiting theft of the same.

In one exemplary embodiment of the invention an optical data storage article is configured to transform from a pre-activated state of functionality to an activated state of functionality. The optical data storage article includes a physical surface modification configured to alter an optical integrity of the optical data storage article upon interaction with an external stimulus.

In another exemplary embodiment, an optical data storage configured for transformation from a pre-activated state of functionality to an activated state of functionality is provided. The article includes an anti-theft feature having a physical surface modification, an adhesive layer in contact with the physical surface modification, a polymer layer reversibly coupled to the adhesive layer, and an electrical circuit coupled to the physical surface modification and configured to provide a thermal response to the physical surface modification, the polymer layer, or the adhesive layer, such that upon interaction with an external stimulus at least a portion of the adhesive layer is irreversibly coupled to the physical surface modification in the activated state.

Another exemplary embodiment of the invention is a method for selling an optical data storage article. The method includes receiving an optical data storage article having a physical surface modification to inhibit data being read from at least a portion of the optical data storage article in a pre-activated state of the optical data storage article. The method further includes interacting the optical data storage article with an external stimulus to render the data in the optical data storage article accessible to the reader, and conducting a monetary transaction at a first location.

These and other advantages and features will be more readily understood from the following detailed description of preferred embodiments of the invention that is provided in connection with the accompanying drawings.

DETAILED DESCRIPTION OF EXEMPLARY EMBODIMENTS

Figure 1:
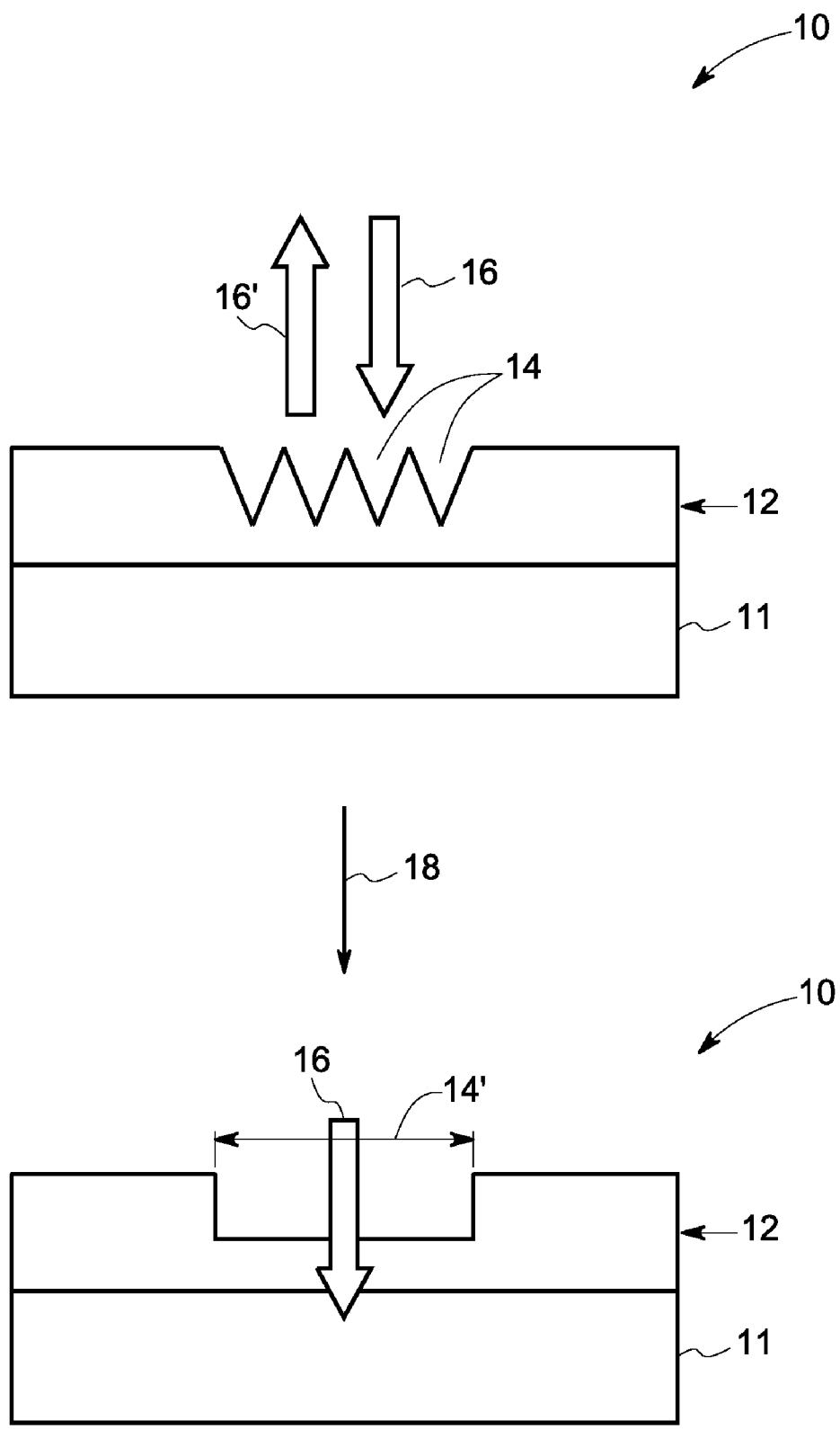
FIG. 1 is a cross-sectional side view of an optical data storage article employing a physical surface modification as an anti-theft feature in accordance with an exemplary embodiment of the invention.

The invention relates to an optical data storage article having an anti theft feature for inhibiting theft or unauthorized use of the optical data storage article. The anti theft feature includes a physical surface modification that is configured to alter the optical integrity of the optical data storage article upon exposure to one or more external stimulus. The physical surface modification of the optical data storage article is configured to enable a change of functionality of the optical data storage article from a pre-activated state to an activated state of functionality.

As used herein, the term "optical data storage article" refers to an article that includes an optical data layer for storing data. The stored data may be read by, for example, an incident laser. The optical data storage article may include one or more layers. Further, the optical data storage article may be protected by employing a protective outer coating. The protective outer coating is transparent to the incident laser, that is, the protective outer coating allows the incident laser to pass through and reach the optical data layer. The optical data storage article may be an optical storage medium, such as a compact disc (CD), a digital versatile disc (DVD), multi-layer structures, such as DVD-5 or DVD-9, multi-sided structures, such as DVD-10 or DVD-18, a high definition digital versatile disc (HD-DVD), a Blu-ray disc, a near field optical storage disc, a holographic storage medium, or another like volumetric optical storage medium, such as, for example, two-photon or multi-photon absorption storage format. As will be described in detail below, if the optical data storage article is taken out of its packaging without being authorized, or if the optical data storage article is attempted to be played without being authorized, the physical surface modification may render the article unreadable. In an exemplary embodiment, the optical data storage article may be made of a polycarbonate. As used herein, the term "polycarbonate" refers to both aliphatic and aromatic polycarbonates, and any co-polymers of polycarbonates incorporating structural units derived from one or more dihydroxy compounds. For example, aromatic polycarbonates marketed under the trade names LEXAN® or MAKROLON® are suitable polycarbonates.

In other embodiments, the optical data storage article may also include an identification card, a passport, a payment card, a driver's license, a personal information card, or other plastic or plastic coated security documents, all of which employ an optical data layer for data storage. As will be described in detail below, in these embodiments, the physical surface modification renders the article unreadable by the reader until it is processed prior to being issued to the concerned authority. Hence, if the article is stolen before being issued, the data in the optical data layer is not readable and therefore the article is prevented from any un-authorized use before issuance.

As used herein, the term "pre-activated state" of functionality refers to a state of functionality of the optical data storage article where the physical surface modification has not yet been exposed to one or more external stimulus as will be described in the various embodiments of the invention. In the pre-activated state, the optical data storage article is not readable, that is, in the pre-activated state at least a portion of the data on the optical data layer may not be read. In an exemplary embodiment, some or all of the portions of the optical data layer may not be read by the incident laser in the pre-activated state. For example, the physical surface modification may alter the readability of the optical data layer in certain portions and make the data in these portions inaccessible to the incident laser of a readout device. In embodiments where the data in some portions of the optical data layer is unreadable, undesirable noise or disturbances may result when an attempt is made to read the data from these unreadable portions, while the other portions may be read without disturbances. In the case where the optical data storage article is a CD or a DVD, the physical surface modification may be opaque to the incident laser, diffract the incident laser, or interfere with readout in a pre-activated state.

In certain embodiments, the physical surface modification may render the optical data storage article partially or completely unreadable in the pre-activated state of functionality due to the optical data storage article being unbalanced, or otherwise have an altered mechanical property that inhibits the optical data storage article from spinning at the correct speed within the optical drive. The physical surface modification may also prevent the optical data storage article from physically loading into the optical drive or reader. Upon removal or alteration of the physical surface modification after activation, the optical data storage article has the appropriate optical properties to be loaded, spun, and read without error in the optical drive.

Contrary to the pre-activated state, the "activated state" of functionality of the optical data storage article refers to the state where the optical data storage article has been exposed to one or more external stimulus as will be described with regard to various embodiments of the invention. In the activated state of functionality, the data in the optical data layer is readable. In other words, the optical data storage article may be read without any noise or disturbances/errors, which may otherwise have been present in the pre-activated state.

As used herein, the term "optical integrity" refers to an optical state of the optical data storage article where a predetermined change in the optical state results in the data of the optical data storage article being read by the reader. The optical change may include a change in an optical property, such as reflectivity, single layer reflectivity, dual layer reflectivity, refractive index. In the pre-activated state, the physical surface modification may act as a read-inhibit device by inhibiting the laser from reaching at least a portion of the optical data layer and reading the data on the optical data layer. For example, the physical surface modification may absorb or reflect a significant portion of the incident laser, thereby impeding it from reaching the optical data layer to read the data. If an attempt to remove the physical surface modification (e.g. peel off) from the optical data storage article in the pre-activated state is made, any portion of the physical surface modification which is left on the surface of the optical data storage article (e.g. a residue) may inhibit the laser from reaching at least a portion of the optical data layer.

The external stimulus may include a laser, infrared radiation, thermal energy, infrared rays, X-rays, gamma rays, microwaves, visible light, ultraviolet light, ultrasound waves, radio frequency waves, microwaves, electrical energy, chemical energy, magnetic energy, mechanical energy, or combinations thereof. Furthermore, inter-conversion between any of the above listed external stimuli (e.g. conversion of radio frequency energy first to electrical energy, and then optionally to thermal energy) is also included within the scope of this invention. The interaction of the external stimulus with the physical surface modification may include continuous, discontinuous, or pulsed forms of the external stimulus. Furthermore, the activation may be done by using a wireless stimulus (i.e. heat or electromagnetic radiation of appropriate power and wavelength such as radio waves) at the point of sale (POS) of the plastic element, which will deliver the appropriate amount of energy needed to the optical data storage article to which the physical surface modification is disposed.

As used herein, the term "physical surface modification" embodies structures or textures formed on a surface of the optical data storage article. The structures or textures of the physical surface modification may be two dimensional (2D) or three dimensional (3D) structures formed on the surface of the optical data storage article, such that the structures or textures are responsive to direct or indirect external stimulus. In certain embodiments, the physical surface modification may include one or more of a grating, a scratch, a cavity, a pattern or texture, a coating, pillars, posts, microspheres, a foam, or an adhesive material. Suitable microspheres include, but are not limited to, such as those marketed under the name of Expancel® Microspheres by Akzo Nobel, or those present in the dicing tapes marketed by the Nitto Denko Corporation under the trade names REVALPHA®, or those marketed under the name of Ropaque opaque polymer by Rohm and Haas Company. In some embodiments, the physical surface modification, such as a scratch or a cavity may be formed in the polycarbonate substrate of the optical data storage article. In these embodiments, the physical surface modification may be formed by patterning the polycarbonate substrate of the optical data storage article. In some embodiments, the features of the physical surface modification may be a few micrometers in size. The physical surface modifications, such as a grating, a scratch, or a cavity may either have a plain or a textured surface. Further, the physical surface modifications may be either only on the surface or may be in the volume of the optical data storage article. Further, the optical data storage article may employ one or more of the same or different kind of physical surface modifications. The physical surface modification may be placed at distinct spots on the article or over the entire data storage region of the article.

In certain embodiments, the physical surface modification may include a reflective grating. The reflective gratings can be surface or volume gratings. The volume gratings typically have higher reflection efficiency and can be made by holographic recording. The features of the gratings may be of micron or submicron size. One of the major advantages of a physical surface modification that includes a reflective grating is the ease in manufacturability of the reflection gratings on optical quality polycarbonate used in the manufacture of DVDs surfaces, by conventional embossing or injection molding processes. The position, size and material of the gratings can also be easily controlled by using the above mentioned manufacturing processes. In certain embodiments, a reflective grating having specific microstructures is affixed to a polycarbonate article, e.g., a DVD for anti-theft purpose. The grating has a reflection efficiency of greater than about 30% for a read laser at 650 nm employed for reading data from an optical data storage article, thereby blocking the reading of the underlying data layers prior to activation. The optical data storage article becomes playable after undergoing activation at a point of sale (POS) that reduces the grating reflectivity by at least partially removing the microstructures of the grating. It should be noted that for simplicity, throughout the application the term "point-of-sale" is used to represent any location where the authorization of the optical article takes place to make it available to the user, such as a customer. In some embodiments, the microstructures of the gratings may be altered or destroyed by thermally decaying the microstructures.

In some embodiments, the physical surface modification may be filled with a filler material that makes the optical data storage article unreadable in the pre-activated state, but upon activation renders the optical data storage article readable. The filler materials may have a refractive index that is matched or substantially similar to that of the physical surface modification and allows the incident laser to read the data in the article. In one embodiment, a difference in refractive index between the filler material and the physical surface modification is less than about 0.1. In some embodiment, the filler material may be irreversibly coupled to the physical surface modification upon interaction with an external stimulus. The glass transition temperature of the physical surface modification material is greater than a glass transition temperature of the filler material. For example, if the filler material is filled by flowing the filler material into the features of the physical surface modification, it is desirable for the physical surface modification to maintain dimensional stability at the elevated temperature. The filler materials may be maintained at an elevated temperature ($T_{elev}$) while filling the physical surface modification. In these embodiments, the $T_{elev}$ is higher than the glass transition temperature of the filler material ($T_{g1}$) but lower than or equal to the glass transition temperature of the material of the physical surface modification ($T_{g2}$), i.e., $T_{g1} < T_{elev} \leq T_{g2}$. In one example, the filler material may include a polymeric material having a weight average molecular weight between about 1000 g/mol to about 1,000,000 g/mol.

In certain embodiments, the reflection grating is made out of a low molecular weight, and low glass transition temperature (Tg) polymer. In these embodiments, the polymer chains are short and have high mobility at the heating temperature so that the microstructure of the physical surface modification can be altered relatively short time frame, e.g. in the time frame of activation of the optical data storage article. In an exemplary embodiment, the physical surface modification having a low molecular weight polyacrylate with a glass transition temperature (Tg) of about 5° C. is made from 2-phenoxyethyl acrylate. At temperatures above Tg, the polymer may become flowable, thereby filling in the microstructures of the gratings, resulting in the decaying of the microstructures of the reflection gratings. This reduces the reflectivity of the grating. As the microstructure decays and the surface modification becomes transparent to the 650 nm reading laser beam, the optical data storage article regains playability. Non-limiting examples of low Tg UV-curable materials include ethoxyethoxyethyl acrylate, ethoxylated nonylphenol acrylate. Alternatively, the reflection grating is made out of a thermally-degradable polymer and the microstructure degrades at an elevated temperature. Non-limiting examples of thermally degradable polymers include poly(α-methyl styrene) that have low degradation temperature (~100° C.). Upon activation, the thermally degradable polymer degrades at POS upon heating at $T_{elev}$ and the loss of the features of the microstructures that define the physical surface modification enables the optical integrity and playability of the optical data storage article.

In some embodiments, during activation, the physical surface modification is cured by employing a microheater powered by RF circuitry. The microheater may be made out of a thin layer of transparent indium tin oxide (ITO). Upon "activation" at POS, energy transported from the RF circuitry converts into Joule heat surrounding the microheater, thereby increasing the local temperature of the physical surface modification, such as a grating above the Tg of the grating material. In one embodiment the microstructures of the physical surface modification are filled with a refractive index matching adhesive material. The adhesive layer may form a part of a tag (e.g. a wirelessly powered flexible tag) that is coupled to the physical surface modification. Prior to activation, the adhesive can be easily detached from the grating with the removal of the tag, leaving behind a strong reflective grating that blocks the reading of the optical data storage article. In some embodiments, the physical surface modification, such as a reflection grating, includes a polymer that contains a functionality that is capable of forming covalent bonds with the adhesive layer upon activation. The adhesive strength at the adhesive/physical surface modification interface can be increased (e.g. from low to high tack) by activation at the POS that will deliver the appropriate amount of energy needed to the physical surface modification on the optical article. The adhesive layer comprises monomers that possess crosslinkable functionalities (e.g. epoxides, aziridines) either into the backbone of the adhesive polymer system or simply into the adhesive formulation. If the grating polymer comprises sufficient functionality (e.g. Kraton copolymer which possesses at least one unsaturated block, i.e. styrene-isoprene-styrene block copolymers) that can react with the crosslinking mechanism which is taking place in the adhesive layer, then upon "activation" the adhesion forces at the adhesive/grating interface can be sufficiently increased so that at least a portion of the adhesive layer remains irreversibly coupled to the physical surface modification. Therefore by employing a crosslinking strategy, the strength of the adhesive/label interface may be decreased and the strength of the adhesive/grating interface may be increased simultaneously upon activation, which will then allow the tag to be removed from the article and leave behind the index-matching adhesive in the microstructures of the physical surface modification. The physical surface modifications having the index-matching adhesive in the microstructures renders the article playable after activation.

In another embodiment, the physical surface modification comprises a polymeric foam material. The foam material may be prepared and deposited in-situ via selective solvent dissolution followed by phase separation of polymers in the form of a coating on the article. The foam can be either an open pore structure or a closed pore structure. Initially, this foam scatters the laser light rendering the article unplayable. During activation, while heating the foam above Tg of the polymeric foam material, the porous structure of the foam collapses into an optically transparent layer, thereby making the article playable after activation. For example, porous structures may be created by incorporating hollow spheres or beads into a polymer film. Examples of suitable hollow spheres include those distributed by Rohm and Haas under the trade name Ropaque®. In some embodiments, the physical surface modification can be an ordered array of holes such as an inverse opal lattice or a surface breath figure. One exemplary embodiment of a physical surface modification is a three dimensional array of air bubbles in a polymer film such as described in Science, Volume 292, Pages 79-83, 2001, which is incorporated herein in its entirety by reference.

Referring now to FIG. 1, there is shown a portion 11 of an optical data storage article 10 having a physical surface modification 12 in a pre-activated state. The physical surface modification 12 includes a pattern/grating 14. As illustrated, when a read laser 16 is incident on the pattern 14, a majority of the laser 16 is reflected as indicated by the arrow 16'. Accordingly, the read laser 16 is not able to reach the optical data layer (not shown) of the optical data storage article 10, and thus is unable to read the data stored in the optical data storage article 10. However, as indicated by the arrow 18, upon activation by the external stimulus, the pattern 14 is converted to 14' that is configured to allow the read laser to reach the optical data storage article and read the data from the optical data layer of the optical data storage article 10.

Figure 2:
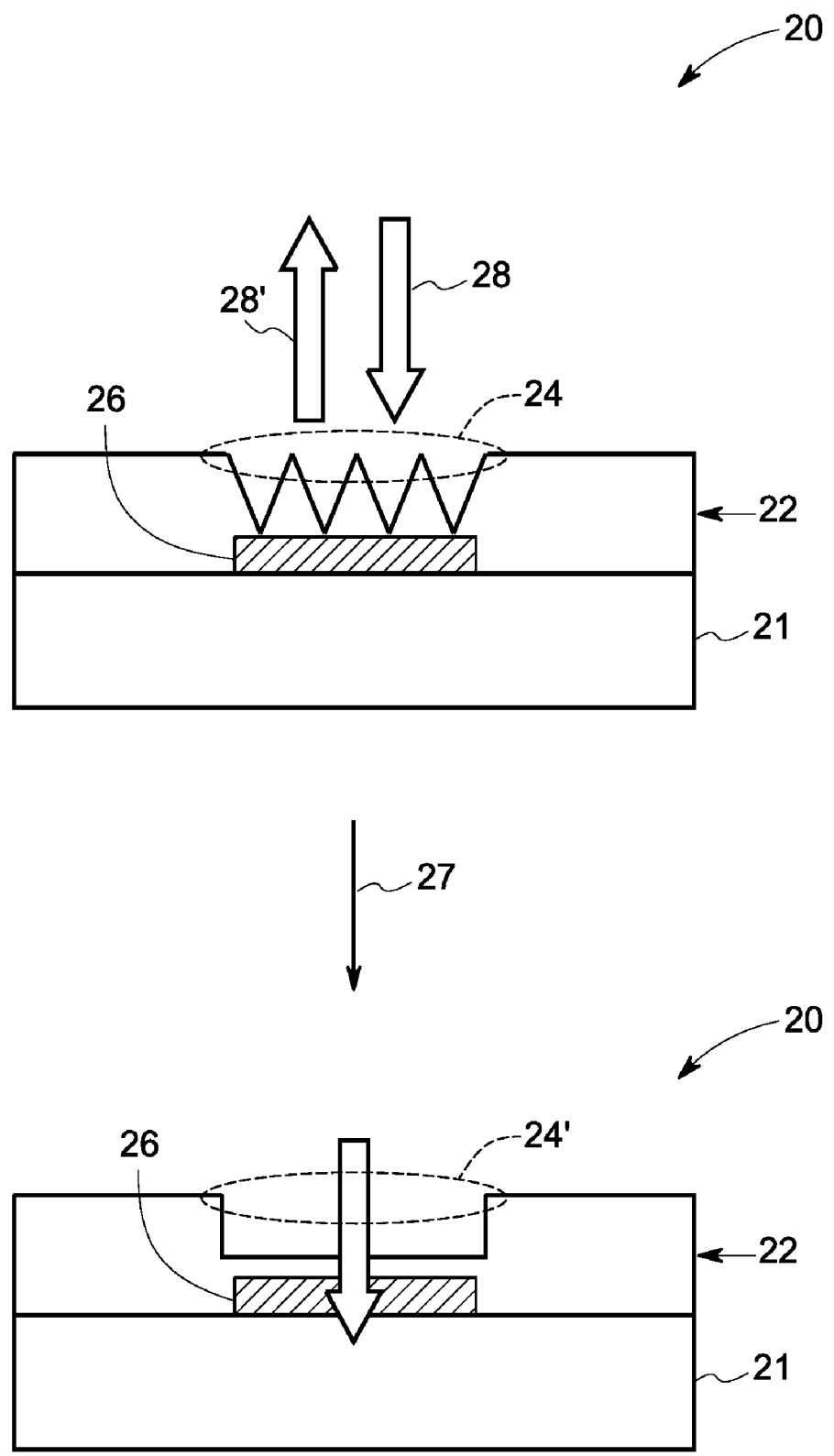
FIG. 2 is a cross-sectional side view of an optical data storage article employing a physical surface modification in operative association with a transparent layer in accordance with an exemplary embodiment of the invention.

FIG. 2 illustrates a portion 21 of an optical data storage article 20 employing a physical surface modification 22 having a grating 24. The portion of the physical surface modification 22 having the grating 24 is in operative association with a transparent layer 26 of indium tin oxide (ITO) such that upon exposure to external stimulus, the transparent ITO layer 26 is configured to provide thermal/electrical energy to the grating 24, thereby altering the shape of the grating 24 to allow the read laser 28 to reach the optical data layer of the optical data storage article 20. As illustrated, in the pre-activated state of the optical data storage article 20, the read laser 28 is reflected back by the grating 24 as indicated by the arrow 28'.

As noted above, in certain embodiments, the physical surface modification is in operative association with an adhesive layer. The adhesive layer may be reversibly coupled to the physical surface modification. The adhesive layer may include a plurality of individual adhesive layers, which form a stack generally referred to as the adhesive layer. The adhesive layer may be coupled to a backing layer. Similarly, the backing layer may include a plurality of individual layers, which form a stack generally referred to as the backing layer. The adhesive layer includes a first surface and a second surface. The first surface of the adhesive layer along with the physical surface modification may form a second region at the adhesive layer/physical surface modification interface. The second surface of the adhesive layer defines a second region at the interface between the adhesive layer and the backing layer. The first surface of the adhesive layer includes a selectively modifiable tack strength at pre-determined locations. As used herein, the term "selectively modifiable" refers to the ability of the adhesive layer to modify the strength of the adhesive bond. The adhesive layer may have uniform tack strength throughout. Alternatively, the adhesive layer may have variable tack strength, that is, the adhesive layer may have different tack strength at different portions of the first surface. For example, the adhesive layer may have certain portions that have higher tack strength as compared to other portions at the interface defined by the first surface. As used herein, tack strength refers to "stickiness" of the adhesive layer. The tack strength is a measurement of the strength of adhesion, typically measured using standard peel tests and reported in units of pounds-force per inch. Upon interaction with one or more external stimuli, the locus of failure of the adhesive layer is altered to change the functionality of the optical data storage article from the pre-activated state to the activated state. As used herein, the term "locus of failure" means the physical location at which an adhesive bond breaks or fractures. For example, in the pre-activated state, the adhesive layer may be configured to have locus of failure at the first region, that is, at the interface between the adhesive layer and the optical data storage article. Whereas, when an attempt is made to decouple the adhesive layer from the backing layer in the activated state, in some embodiments, the adhesive layer may undergo a failure at the second region, that is, at the interface between the adhesive layer and the backing layer or a cohesive failure within the adhesive layer. In these embodiments, the portion of the adhesive layer remaining on the physical surface modification renders the optical data storage article readable.

As will be described in detail with regard to FIGS. 4 and 5, in embodiments where the physical surface modification includes a radio frequency circuitry disposed within a sub-layer of the backing layer and adjacent to the adhesive layer, the locus of failure in the pre-activated state may occur within the backing layer, for example, between the radio frequency circuitry layer and the backing sub-layer(s). However, in the activated state, that is after interaction with the appropriate and authorized external stimulus, the locus of failure is shifted such that a portion of the adhesive layer is removed while leaving a portion of adhesive layer on the physical surface modification to render the article readable. Alternatively, the locus of failure may be at the physical surface modification/optical data storage article interface. In this embodiment, the entire physical surface modification including the adhesive layer and the backing layer is completely and cleanly removed (e.g. peeled off) from the surface of the optical data storage article, thereby making the article readable. As used herein, the term "clean adhesive failure" or "clean failure" or "clean fracture" or "cleanly removed" or "clean removal" is defined as the removal of the physical surface modification such that no significant residue of the adhesive layer or the physical surface modification is left behind on the optical data storage article. For example, "clean removal" of the physical surface modification in activated sate means that any minimal residue of the physical surface modification or the adhesive layer which might be left behind on the surface of the physical surface modification, is small enough in quantity so as to not make the optical data storage article unreadable.

The adhesive layer may include a material having reversibly or irreversibly modifiable tack strength, that is, once altered, the tack strength may or may not be modifiable back to the initial tack strength. In one embodiment, the change from the pre-activated state to the activated state is irreversible. The decrease in tack strength at the first surface or region of the adhesive layer may be induced by a variety of mechanisms including, but not limited to, a chemical mechanism, an electrochemical mechanism, a thermal mechanism, a physical mechanism, a cross linking mechanism, or any combination thereof.

The adhesive layer may include one or more pressure sensitive adhesives materials. In at least one embodiment, the pressure sensitive adhesive is crosslinkable, that is, the pressure sensitive adhesive includes crosslinkable functionality. For example, suitable materials may include acrylate-based polymers, which contain crosslinkable functionalities. In one embodiment, the adhesive layer may include an acrylate based material that contains a glycidyl acrylate functionality, an epoxide functionality, an aziridine functionality, an ester functionality, an anhydride functionality, a carbonate functionality, or any other crosslinking functionality commonly known to one skilled in the art of polymer crosslinking.

In one embodiment the adhesive layer comprises an additive, which can induce a change in tack strength at the first surface or region of the adhesive layer. The additive may be an organic additive or an inorganic additive. For example, in one embodiment the adhesive layer comprises an expandable microsphere additive, which is designed to undergo an increase in volume when heated. Suitable microspheres include such as those marketed under the name of Expancel® Microspheres by Akzo Nobel, or those present in the dicing tapes marketed by the Nitto Denko Corporation under the trade names REVALPHA®.

The backing layer may be made of any flexible material, including but not limited to a plastic material. In one embodiment the backing material contains functionality that is capable of forming covalent bonds with the adhesive layer upon activation. The backing layer can be made of a polymeric material with a glass transition temperature (Tg) greater than about 150° C. Alternatively, the backing layer may be made of a crystalline polymer having a melting point above about 180° C. Suitable example of the backing layer material may include polycarbonates, polyethylenes, polyesters, polyimides, polysulfones, polyethylene terapthalate, polyamides, polyacrylates, polyurethanes, or copolymer or combinations thereof.

Figure 3:
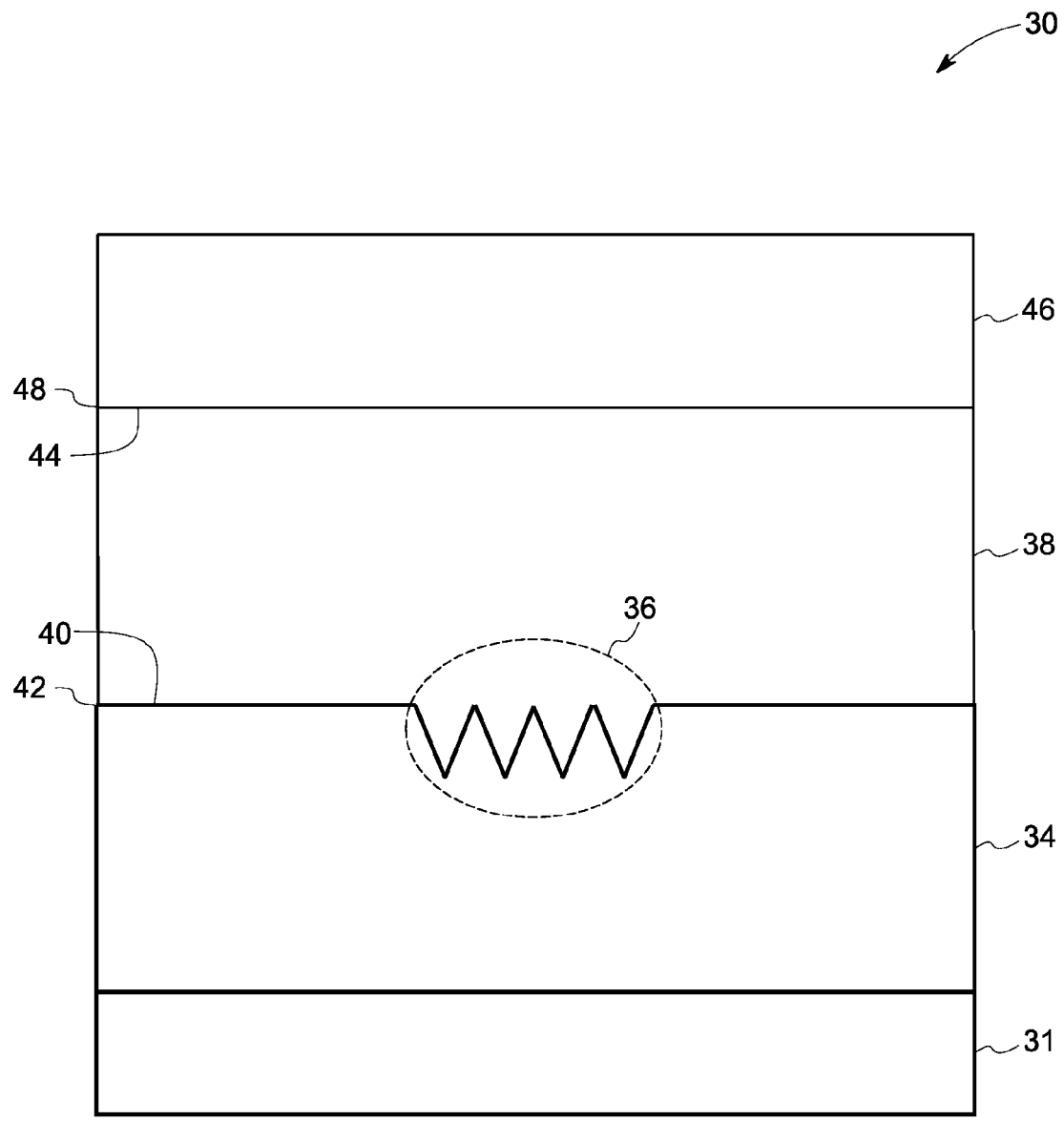
FIG. 3 is a cross-sectional side view of an optical data storage article employing a physical surface modification in combinations with an adhesive layer in accordance with an exemplary embodiment of the invention.

Referring now to FIG. 3, a portion 31 of the optical data storage article 30 includes a physical surface modification 34. The physical surface modification 34 includes a reflective grating 36. The physical surface modification 34 is in operative association with an adhesive layer 38. The adhesive layer 38 includes a first surface 40 and a second surface 44. The first surface 40 of the adhesive layer 38 is coupled to the physical surface modification 34 to define a first region 42. The second surface 44 of the adhesive layer 38 is coupled to the backing layer 46 to define a second region 48. The backing layer 46 may be made of a polymer material. In the activated state, when an attempt is made to decouple the adhesive layer 38 or the backing layer 46 from the physical surface modification 34, the second region 48 between the adhesive layer 38 and the backing layer 46 undergoes a clean adhesive failure. Alternatively, the failure may also occur within the adhesive layer 38. Either way, at least a portion of the adhesive layer is retained on the physical surface modification 34. As noted above, the portion of the adhesive layer disposed between the features of the physical surface modification 34 renders the grating 36 of the physical surface modification 34 relatively less reflective to the incident laser, thereby making the optical data storage article 30 readable. In the pre-activated state the adhesive layer 38 may undergo a failure at the first region 42. The failure at the first region 42 may result in adhesive layer being removed from the physical surface modification 34, thereby rendering the optical data storage article unreadable.

As will be described in detail below, the physical surface modification may be in operative association with one or more devices, such that the devices may receive energy from the external stimulus in one form and convert it into another form. The converted form of energy is then transferred to the adhesive layer of the physical surface modification to change the state of functionality of the optical data storage article. For example, the physical surface modification may be in operative association with radio frequency (RF) circuitry, which may react with an external stimulus, such as radio frequency waves, and convert it into electrical energy and/or thermal energy. The thermal energy may then be utilized by the adhesive layer to change the functionality of the optical data storage article from the pre-activated state to the activated state. Further, the RF circuitry may include a programmable logic chip, such as in a radio frequency identification (RFID) tag. Upon exposure to the appropriate RF radiation, the RF circuitry employing, for example, a heater chip, is energized and converts the RF radiation into thermal energy. This conversion of RF energy into thermal energy creates a temperature spike of about 50° C. to about 200° C. and locally heats a specific area of the physical surface modification. In another example, one or more microheaters may be employed to heat the adhesive layer. The microheaters may be employed to heat the entire adhesive layer. Alternatively, the microheaters may be employed to heat the portions of the adhesive layer having relatively higher tack strength.

As will be described in detail below with regard to FIG. 4, a tag having electrical circuitry may be employed to supply electrical or thermal energy to the physical surface modification. In an exemplary embodiment, the tag may be a wirelessly powered flexible tag (WPFT) having electrical circuitry. The physical surface modification may be used in combination with anti-theft features as disclosed in U.S. Pat. application Ser. No. 11/538451, which is incorporated herein in its entirety by reference. Examples of electrical circuitry may include radio frequency circuitry, which may be used to interact with the external stimulus to change the external stimulus into electrical or thermal energy, which then interacts with the physical surface modification to change the functionality of the optical data storage article. The WPFT may be coupled to a surface employing the physical surface modification by using a pressure-sensitive adhesive or by using other coupling mechanisms. Non-limiting examples of coupling mechanisms include static cling, gravity, bracing, sandwiching, mechanical clamping or any other physical means of adhesion. The electrical circuit may be configured to transform the external stimulus to electrical or thermal energy. The WPFT may either be permanently affixed to a surface or may be removably coupled to the surface having the physical surface modification. The WPFT may be in direct contact with the physical surface modification. The WPFT may be disposed on or adjacent to the physical surface modification. Alternatively, the WPFT may be in operative association with the physical surface modification, such that the WPFT is able to transfer the thermal or electrical energy produced by the WPFT to the physical surface modification.

Various embodiments of the WPFT described herein allow the wireless transfer of energy from an external stimulus to the physical surface modification through the WPFT, because the WPFT is configured to act as a "wireless" device. As used herein, the terms "wireless", "wirelessly", "wireless powered", "wirelessly powered" or "wireless activation" all refer to a mechanism of energy transfer in which electromagnetic energy is transported through space (e.g. without the use of any connecting wires or other physical connections) from a remote external stimulus to the WPFT. Non-limiting examples of suitable external stimuli that may be used to interact with the WPFT include laser radiation, infrared radiation, thermal energy, X-rays, gamma rays, microwaves, visible light, ultraviolet light, ultrasound waves, sound waves, radio frequency (RF) waves, electrical energy, chemical energy, magnetic energy, mechanical energy, or combinations thereof. Furthermore, inter-conversion between any of the above listed external stimuli (e.g. conversion of radio frequency waves to electrical energy and/or thermal energy) is also contemplated within the scope of this invention. The interaction of the external stimulus with the WPFT may include continuous, discontinuous, or pulsed forms of the external stimulus. In one embodiment, the external stimulus is radio frequency waves generated from an RF power supply, and wirelessly supplied to the WPFT. The RF power supply may contain a programmable interface that controls the WPFT and optionally receives information back from the WPFT.

As used herein, the term "flexible" is synonymous with the term bendable, and the flexible aspect of a WPFT is analogous to the flexible aspect of other known flexible electronic devices such as flexible organic light emitting diodes, flexible liquid crystal displays, flexible circuit boards, and flexible solar cells. The flexible quality of the WPFT stems from the use of bendable materials within the WPFT, such as plastic or other polymeric materials, or thin metal foil.

In various embodiments, the WPFT includes a coupling layer. The coupling layer may either be a single layer or may be a combination of a plurality of sub-layers, which may be collectively termed as the coupling layer. The thickness of the coupling layer may be uniform or may vary from one point to another. For example, the coupling layer may have a variable thickness when the coupling layer is patterned to form one or more recess to dispose electrical circuits therein. In one embodiment the thickness of the coupling layer may be in a range from about 1 micron to about 100,000 microns. In a preferred embodiment, the thickness of the coupling layer is from about 1 micron to about 1000 microns.

The coupling layer may be coupled to the optical data storage article by employing variety of coupling mechanisms to promote attraction forces between the WPFT and the optical data storage article. The coupling mechanisms may include an adhesive mechanism, an electrostatic mechanism, a chemical mechanism, an electrochemical mechanism, a thermal mechanism, a physical mechanism, a cross linking mechanism, or any combination thereof. Non-limiting examples of suitable coupling mechanisms include static cling, gravity, bracing, sandwiching, mechanical fixing, clamping, chemical adhesion, or any other physical means of adhesion that affix the WPFT to the optical data storage article. In some embodiments the coupling mechanism may enable reuse of the WPFT. In other words, the WPFT may be coupled and decoupled from the optical data storage article more than once, as desired, and therefore it is envisioned that the WPFT could be a disposable device. Embodiments relating to the reuse of the WPFT with the same or different optical data storage articles are described in more detail below with regard to the adhesive components of the coupling layer. Alternatively, the WPFT may be configured to function as an irremovable device once affixed to an optical data storage article. The attraction forces produced by the above mentioned coupling mechanisms may or may not be uniform at the interface between the coupling layer and the optical data storage article. For example, the attraction forces may be weaker at the edges of the WPFT to facilitate removal (e.g. peeling off) of the WPFT once the predetermined and desired electrical and/or thermal response has been induced in the optical data storage article.

The coupling layer may include a plurality of individual sub-layers, which form a stack generally referred to as the coupling layer. In one embodiment, at least one sub-layer of the coupling layer comprises an adhesive component. Non-limiting examples of suitable adhesive components include pressure sensitive adhesives, epoxy based adhesives, thermoset adhesives, acrylate based adhesives, silicone-based adhesives, elastomer based adhesives or any combination thereof. As use herein, the term "pressure-sensitive adhesive" includes all polymeric adhesive materials with a glass transition temperature (Tg) below about 50° C. In embodiments comprising an adhesive component, the coupling layer includes a first coupling surface with a first tack strength, and a second coupling surface with a second tack strength. As used herein, the term "tack strength" refers to "stickiness" of the coupling layer, and is a measurement of the strength of adhesion, typically measured in units of pounds-force per inch. The first surface of the coupling layer is typically coupled to the optical data storage article to define a first region. The second surface of the coupling layer may be coupled to other components of the WPFT, such as an electrical circuit layer or an optional backing layer, to define a second region. In at least one embodiment, both the first and second surfaces of the coupling layer are coupled to the optical data storage article.

In embodiments where the coupling layer comprises an adhesive component, one aspect of the coupling layer is the ability of the WPFT to be decoupled from an optical data storage article such that the WPFT undergoes a "clean adhesive failure" at the first region between the coupling layer and the optical data storage article. As used herein, the term "clean adhesive failure" is defined as the removal of the WPFT from the optical data storage article such that no significant residue of the coupling layer is left behind on the optical data storage article. As used herein, and with respect to the term "clean adhesive failure", the term "significant" refers to a quantity that affects or interferes with the usability of the optical data storage article. For example, as will be described in detail below, in the case where the optical data storage article is a DVD, "clean adhesive failure" of the WPFT from the surface of the of the DVD means that the quantity of residue of the coupling layer which might be left behind on the surface of the DVD, including residue which is not visible to the naked eye or touch, is sufficiently small in quantity as to not interfere with the readability of the DVD in a standard DVD reader.

The WPFT further comprises electrical circuitry, including at least one electrode and/or at least one heating element. As used herein, the electrical circuitry includes, but is not limited to, a thermocouple, a light-emitting diode, a strain gauge, a sound detecting element, an antenna, a transistor, a diode, a rectifier, a logic chip, a radio frequency identification chip, a capacitor, an integrated circuit, an electrical receiver, a photocell, a rectifier, a resistor, a surface mount resistor, a chip resistor, an electrode, a surface mount light emitting diode (LED) or any combination or multiple thereof. In one embodiment, the WPFT may also contain an integrated circuit with a programmable unique identification number as is used in RFID tags. Various components of the electrical circuitry may be patterned onto the WPFT by a variety of microelectronic techniques including, but not limited to, lithography, sputtering, screen printing, ink-jet printing, or any other routine patterning method which is known to one skilled in the art of microelectronics. Alternatively, various components of the electrical circuitry may be added to the WPFT by physical means, such as "pick-and-place" or other robotic techniques commonly used in the microelectronics industry. In an exemplary embodiment, the electrical circuitry comprises a radio frequency circuitry, including a radio frequency antenna coupled to various additional circuitry components. The radio frequency circuitry is in electrical communication with at least one electrode and/or at least one heating element contained within the WPFT. The electrical circuitry may be disposed on a sub-layer of the coupling, or in embodiments where the WPFT employs an optional backing layer the electrical circuitry may be coupled to the backing layer.

In such embodiments where the WPFT comprises at least one heating element, the heating element may be fabricated from a material with sufficiently high surface ohmic resistivity. High surface ohmic resistivity can be achieved either by controlling the dimensionality of the heating element (e.g. making the heating element very thin), or as a result of the intrinsic electrical resistivity of the material. For example, materials with a surface ohmic resistivity greater than about 5 ohms/square are suitable, and materials with an ohmic resistivity greater than about 15 ohms/square are especially preferred. Non-limiting examples of suitable heating element materials include titanium, copper, nickel, gold, tantalum-nitride, aluminum, molybdenum, titanium-tungsten, chrome, platinum, nichrome, indium tin oxide (ITO) and any combinations thereof. Embodiments where the heating element is encased in a ceramic or glass housing (e.g. chip resistors) are also contemplated within the scope of this invention. It should be noted that in embodiments comprising a heating element, direct contact between the heating element and the physical surface modification is not strictly required for the WPFT to induce the desired thermal response in the physical surface modification; however, it is preferred.

The WPFT may be in operative association with one or more devices, such that the devices may receive energy from the external stimulus in one form and transfer it to the WPFT. The energy is then transferred from the WPFT to the optical data storage article to which the WPFT is coupled to change the state of functionality of the optical data storage article. For example, the WPFT may react with an external stimulus, such as radio frequency waves, and through operative association with the radio frequency circuitry within the WPFT, convert the radio frequency waves into electrical energy and/or thermal energy. The converted electrical energy may then be transferred to the optical data storage article to change the functionality of the optical data storage article from the pre-activated state to the activated state. In the case where the energy from the external stimulus is converted to an electrical response within the WPFT, current in the range from about 1 microampere to about 1 ampere and voltages in the range from about 1 millivolt to about 100 volts are possible at specific regions between the WPFT and the optical data storage article. In the case where the energy from the external stimulus is converted to a thermal energy within the WPFT, a temperature increase in the range of about 10° C. to about 200° C. is possible at specific regions of the interface between the WPFT and the optical data storage article.

Additionally, the WPFT may contain a feedback loop. The feedback loop may be configured to communicate with the source of the external stimulus that is at a remote location and provide inputs to regulate the exposure of WPFT to the external stimulus. For example, the feedback loop may be configured to maintain the temperature of the optical data storage article within a predetermined temperature range by controlling the input of external stimulus to the WPFT. Accordingly, when the temperature of the optical data storage article exceeds the predetermined temperature range, the feedback loop communicates with the source of the external stimulus to reduce the amount of external stimulus interacting with the WPFT, thereby controlling the temperature of the optical data storage article. In another example, the feedback loop may be employed to maintain the records for the usage of the devices. When employed to authorize an article, the WPFT may be used to maintain records and/or to maintain inventory.

In some embodiments, the WPFT comprises an integrated logic chip within its electrical circuitry, which is in wireless communication with an external authorization device that controls the output response of the WPFT through a feedback loop. The function of the integrated logic chip is to act as an internal "on/off" switch within the WPFT, such that the WPFT becomes operationally active (i.e., generates an electrical and/or thermal response in the optical data storage article to which it is affixed) only once it has been authorized to do so by an external authorization device. This feature of the WPFT is useful in applications where there is a desire to control the function of the WPFT, such as anti-theft applications.

In one embodiment, energy may be delivered to the WPFT by inductive coupling of low frequency radio waves with a wavelength much longer than the largest dimension of the WPFT. It should be appreciated that RF signals with long wavelengths are preferred for such applications, because they are easier to shield than signals with shorter wavelengths. In one embodiment, the transmission means may be identified as an air-core radio frequency transformer. For such transformers to efficiently transfer RF power, they must be matched to the impedance of the external source and load impedance. In one embodiment, the source of external stimulus is the external RF power generator and the load is the heating element(s) and/or electrode(s) to be operated on the WPFT. Impedances of 50 ohms are typical for the source, but impedances may range from a few ohms up to a few hundred ohms for the load(s). As will be appreciated, any impedance matching technique well known in the art can be used to match the transformer, but circuits that require only capacitors and the native inductance of the transformer coils are strongly preferred for their small size.

In one embodiment the energy transferred to the WPFT by inductive coupling is radio frequency alternating current whose frequency may range from hundreds of kHz to hundreds of MHz. This RF AC may be used directly for some embodiments of the WPFT, specifically those embodiments comprising at least one heating element. For such RF loads, the signal should be transmitted between the transformer secondary coil on the WPFT and the load by a RF transmission line to minimize radiation and to maintain the proper load impedance. If the load requires DC rather than AC, then a rectifier and possibly other electronic circuitry described above would be necessary to convert the energy into the required form.

Figure 4:
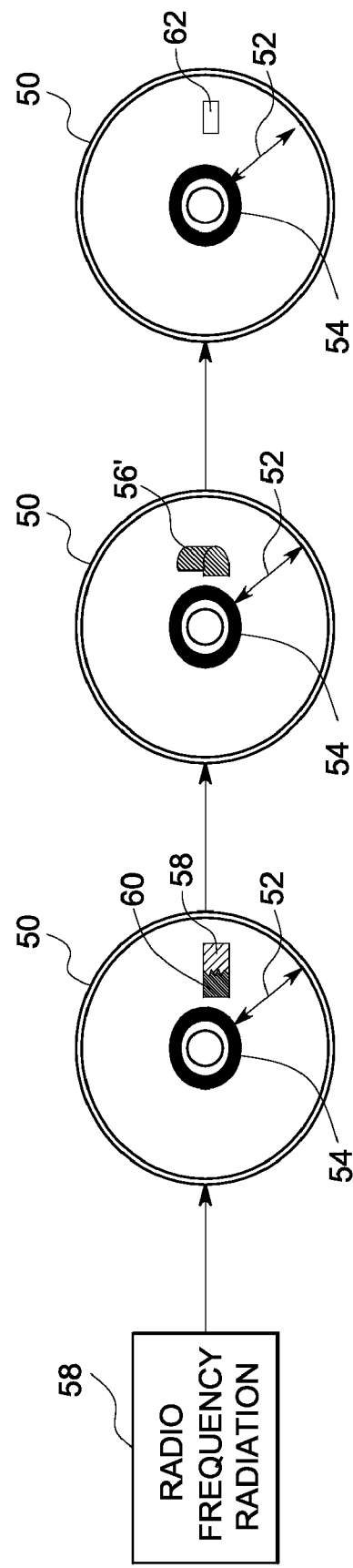
FIG. 4 is a diagrammatical representation of a method for changing a functionality of an optical data storage article in accordance with an exemplary embodiment of the invention.
Figure 5:
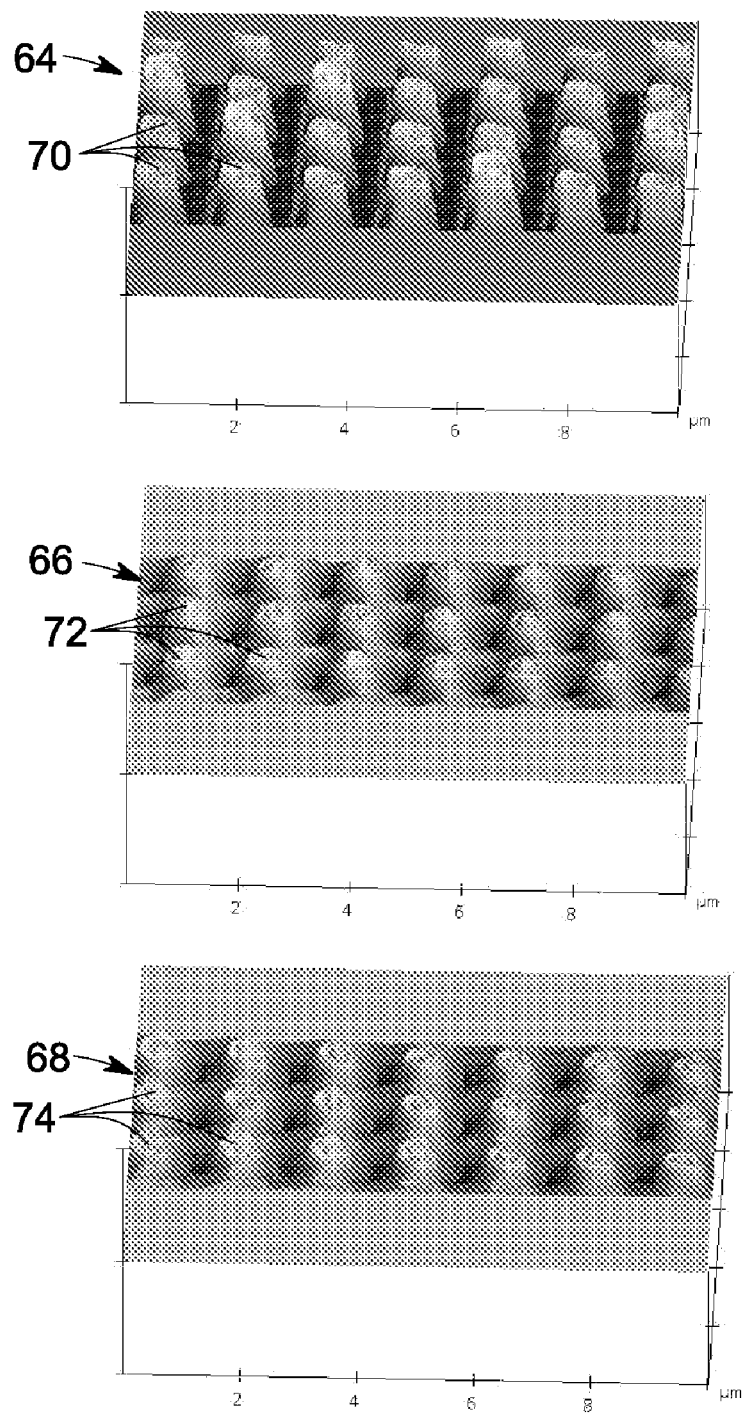
FIG. 5 is a schematic view atomic force microscopy images of three samples baked at different conditions in accordance with an exemplary embodiment of the invention.

With reference to FIG. 4, a method of changing a functionality of an optical article, such as the optical data storage article 50, is illustrated. Although the illustrated method is with regard to optical data storage article 50, it should be appreciated that this method may be employed to change the functionality of other optical articles, such as an ID card, a payment card, a personal information card, flash memory card, etc., during authorization. The optical data storage article 50 includes a data storage region 52 and a non-data storage region or inner hub 54. The data storage region 52 includes an optical data layer (not shown), which stores the data, whereas the inner hub 54 is the non-data storage region of the optical data storage article 50.

In the illustrated embodiment, the wirelessly powered flexible tag 56 includes a coupling layer 58 configured to couple the wirelessly powered flexible tag 56 to the article 50. Furthermore, the wirelessly powered flexible tag 56 includes a layer 60 having electrical circuitry, such as radio frequency circuitry, and one or more heating elements. The radio frequency circuitry is configured to receive an external stimulus, such as radio frequency radiation. The heating element(s) may be distributed across the area of the layer 60. The electrical circuitry is in operative association with the heating element(s). The thermal energy generated by the heating element(s) in response to the input electrical stimulus from the electrical circuitry 60 may be transferred to the substrate by conduction. Alternatively, the electrical circuitry and the heating element(s) of the layer 60 may be disposed in separate layers. The surface of the coupling layer 58, which is to be coupled with the substrate may be mechanically textured or chemically treated for enhancing the coupling between the WPFT 56 and the substrate. The WPFT 56 is in communication with a physical surface modification 62 disposed underneath the wirelessly powered flexible tag 56. The physical surface modification 62 is either destroyed or altered upon interaction with electrical or thermal response provided by the tag 56.

The external stimulus may be selected based on the kind of material of the adhesive layer including a color-shift dye and other additives within the adhesive layer. Herein, the other additives may include organic or inorganic additives in combination with the color-shift dye. For example, the external stimulus may be thermal energy and the temperature of the thermal energy may be based upon the crosslinking rate of a polymer in the adhesive layer. In another example, when the adhesive layer includes a color-shift dye, the external stimulus may be a light source of appropriate wavelength and power to make the color-shift dye transparent to the laser, thereby changing the functionality of the optical data storage article from an un-readable state to a readable state.

Further, the source for external stimulus may be built in the point of sale equipment. As used herein, the term "point of sale equipment" refers to equipment employed at the point in the shop where the sale takes place. For example, the point of sale equipment includes a bar code reader, a radio frequency identification reader, an electronic surveillance article reader, like an acousto-magnetic tag detector or de-activator, such that when the optical data storage article or the packaging having the optical data storage article is swiped through the bar code reader, the physical surface modification is allowed to interact with the external stimulus and the state of the optical data storage article is converted to the activated state. Further, the source of the external stimulus may also be integrated with a hand-held wand or computer controlled boxes at the aisles. It is desirable to have sources that have a power and/or wavelength of the energy, which is not commonly available, specifically to defaulting users, such as shoplifters.

Additionally, the verification of the activation may be conducted on the optical data storage article. The verification may be desirable either to: 1) identify the defaulting users, or 2) to confirm that the optical data storage article was accurately activated at the first point of interaction, such as a point-of-sale. In some embodiments the verification may be conducted at the second location, such as the exit point of the storage location in office premises, or a store. In these embodiments, the security system installed at the exit locations may send out signals indicating whether or not the optical data storage article is activated. Further, a device may be installed in the security system, such that the device may interact with the physical surface modification in the optical data storage article and make it permanently unreadable if the optical data storage article was carried out without being activated.

Example 1

Reflective microstructures with arrays of posts (400 nm pitch depth, 820 nm inter-post separation, see FIG. 4) were imprinted in polystyrene ($M_w$=200,000, Polymer Source) on an n-type silicon wafer of test grade obtained from Montco Silicon Technologies (Spring-City, Pa.). The sample was baked on a pre-heated digital hot plate for 100 and 200 seconds. The temperature on the sample surface was monitored in-situ by using a remote Infrared Pyrometer (HHM290, Omega). FIG. 5 shows tapping-mode atomic force microscopy (AFM) images 64, 66 and 68 of three samples baked at different conditions. The image of the first sample 64 is obtained by baking the sample at the first condition that includes no heating. The image of the second sample 66 is obtained by baking the sample at the second condition that includes heating at a temperature of 320° C. for about 200 seconds. The image of the third 68 is obtained by baking the sample at the third condition that includes heating at a temperature of 375° C. for about 100 seconds. The microstructures of the physical surface modification 70, 72 and 74 decay at these temperatures. In-situ reflection was observed from the iridescent sample surface while the samples were baked on the hot plate using a UV-Vis spectrometer obtained from Ocean Optics. There is no change in reflectivity of the sample 64, which is not subjected to baking. The time dependent decaying of the reflectivity was observed at 405 nm at 320° C. and 375° C. for the samples 66 and 68, respectively. The reflectivity of the samples 66 and 68 at peak wavelength of ~405 nm decreases from about 70 percent to about 30 percent when baked at 375° C. for about 50 seconds.

Example 2

A poly(ethoxylated trimethylolpropane triacrylate) (refractive index=1.4689, Sartomer) reflection grating was made by templating the 3D highly ordered silica colloidal crystal. Methods of making highly ordered silica colloidal crystals are described in "Templated-Directed Preparation of Macroporous Polymers with oriented and Crystalline Array of Voids", by P. Jiang, K. S. Hwang, D. M. Mittleman, J. F. Bertone, and V. L. Colvin, in Journal of American Chemical Society 1999, Vol. 121, pp. 11630-11637. The grating shows strong reflection at ~600 nm wavelength (see FIG. 6). When the microstructures of the polymer grating was filled up by photopolymerizing an index-matching polymer (poly(2-phenoxyethyl acrylate), refractive index=1.5160, Sartomer), the reflectivity of the acrylate grating is greatly reduced.

Example 3

A 1 inch by 2 inch adhesive label is affixed to a DVD by first removing the liner from the tape and pressing the adhesive layer against the reflection grating on the read-side of a DVD. After a few hours, the adhesion of the adhesive is tested by peeling the tape away from the disc. It is found that the adhesive could not easily be removed from the disc, leaving no residue in the reflective microstructure. The grating still shows high reflectivity at 650 nm wavelength. Another labeled DVD is prepared in a similar fashion using another adhesive label affixed to the disc. However, this sample is exposed to a RF source which powers a microheater located on/in the backing of the label. The microheater locally heats the adhesive above its activation temperature (specified as 60-150° C., more preferably 100-120° C.) for several seconds to enhance the adhesion strength to the microstructures. After activation, the plastic label is easily removed from the DVD leaving behind adhesive in the microstructures. This makes the grating almost transparent to 650 nm light. This disc is easily read by a drive with no loss of data.

Example 4

A solution having (i) 10 parts of deionized water, (ii) 3.4 parts of SR-351 which is a commercial product of trimethylolpropane triacrylate obtained from Sartomer Company, Inc. (Exton, Pa.), (iii) 2.5 parts of Ropaque® Ultra opaque polymer emulsion obtained Rohm and Haas Company (Philadelphia, Pa.), and (iv) 47.5 parts of Rhoplex® SG-20 polyacrylate latex emulsion obtained from Rohm and Haas company, was prepared. Rhoplex® SG-20 polyacrylate latex emulsion is supplied at 45.5 weight % solids and has an average particle diameter of about 100 nm. Ropaque® Ultra consists of water-filled styrene/acrylic beads. A wet film of the solution was made by drawdown on a glass slide and on a DVD, respectively. A clean room tape of 60 micron thick with a punched hole was used to set the wet film thickness. A small drop of the solution was transferred to the hole and a glass slide was served as a drawdown bar. The drawdown film was allowed to dry overnight at a temperature of about 25° C., to form a homogeneous film. The reflectivity at 650 nm wavelength of the dried film on a glass substrate before and after a heat treatment at 150° C. for 2 minutes were measured to be 17.4% and 78.6%, respectively, with an optical instrument by Analytical Instrument Systems, Inc. The reflectivity at 650 nm wavelength of the dried film on a DVD substrate before and after a heat treatment at 150° C. for 2 minutes were measured to be 14.4% and 75.8%, respectively. The relatively low initial reflectivity of the films (17.4 percent on the glass substrate and 14.4 percent on the DVD substrate) is due to light scattering off of the Ropaque® Ultra hollow beads that become filled with air. After heat treatment, the reflectivity increases because the hollow beads collapse and less light is scattered.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include some of the described embodiments. Accordingly, the invention is not to be seen as limited by the foregoing description, but is only limited by the scope of the appended claims.

What is claimed as new and desired to be protected by Letters Patent of the United States is:

1. An optical data storage article configured for transformation from a pre-activated state of functionality to an activated state of functionality, comprising:
    physical surface modification configured for altering an optical integrity of said optical data storage article upon interaction with an external stimulus, wherein said physical surface modification comprises a grating, a scratch, a cavity, a pattern, a microsphere, pillars, posts, a foam, an adhesive material, or a combination of two or more thereof; and
    a filler material in operative association with said physical surface modification, wherein a glass transition temperature of said physical surface modification material is greater than a glass transition temperature of said filler material.

2. The optical data storage article of claim 1, wherein the difference in refractive index between said filler material and a material for said physical surface modification is less than about 0.1.

3. The optical data storage article of claim 2, wherein said filler material comprises a polymeric material having a weight average molecular weight between about 1000 g/mol to about 1,000,000 g/mol.

4. The optical data storage article of claim 1, wherein said physical surface modification is in operative association with one or more of a transparent conductive material, radio frequency circuitry, and a wirelessly powered flexible tag upon exposure to said external stimulus.

5. The optical data storage article of claim 4, wherein said transparent conductive material is transparent to a laser employed to read data from said optical data storage article, and wherein said transparent conductive material is disposed between said physical surface modification and said optical data storage article.

6. The optical data storage article of claim 4, wherein said transparent conductive material comprises indium tin oxide.

7. The optical data storage article of claim 4, wherein said wirelessly powered flexible tag is removably coupled to the optical data storage article and configured to interact with said external stimulus.

8. The optical data storage article of claim 7, wherein said wirelessly powered flexible tag comprises an adhesive coupling layer.

9. The optical data storage article of claim 8, wherein said adhesive coupling layer comprises a pressure-sensitive adhesive, a water soluble adhesive, an acrylate-based adhesive, a silicone-based adhesive, an elastomer-based adhesive, an epoxy-based adhesive, a thermoset adhesive, an acrylate-based adhesive, or any combination thereof.

10. The optical data storage article of claim 9, wherein said adhesive coupling layer comprises a patterned surface.

11. The optical data storage article of claim 4, wherein said wirelessly powered flexible tag further comprises electrical circuitry.

12. The optical data storage article of claim 11, wherein said electrical circuitry comprises radio frequency circuitry.

13. The optical data storage article of claim 12, wherein said electrical circuitry further comprises a thermocouple, a light-emitting diode, a strain gauge, a sound detecting element, a diode, an antenna, a dipole, an electrical receiver, a photocell, a resistor, a capacitor, a rectifier, an integrated circuit, a surface mount resistor, a chip resistor, an electrode, a heating element, or any combination or multiple thereof.

14. The optical data storage article of claim 13, wherein said heating element comprises titanium, copper, nickel, gold, tantalum-nitride, aluminum, molybdenum, titanium-tungsten, chrome, platinum, nichrome, indium tin oxide and any combinations or alloys thereof.

15. The optical data storage article of claim 1, wherein said physical surface modification is configured to undergo a change in physical or optical appearance upon direct or indirect interaction with said external stimulus.

16. The optical data storage article of claim 1, comprising a CD, a DVD, a HD-DVD, a Blu-ray disc, a near field optical storage disc, a holographic storage medium, or another volumetric optical storage medium.

17. The optical data storage article of claim 1, wherein said external stimulus comprises a laser, a thermal energy, infrared rays, X-rays, gamma rays, microwaves, visible light, ultra violet light, ultrasound waves, radio frequency waves, electrical energy, chemical energy, magnetic energy, mechanical energy, or a combination of two or more thereof.

18. The optical data storage article of claim 1, further comprising a packaging for the optical data storage article, wherein said packaging enables an external stimulus to be directed towards at least a portion of said optical data storage article.

19. The optical data storage article of claim 18, wherein a window is aligned with at least a portion of said physical surface modification.

20. The optical data storage article of claim 1, wherein said optical article comprises an optical data layer for storing data, wherein at least a portion of said optical data layer comprises a tailored menu, wherein said tailored menu renders the optical data storage article un-readable in said pre-activated state of functionality.

21. An optical data storage article configured for transformation from a pre-activated state of functionality to an activated state of functionality, said optical data storage article having an anti-theft feature, comprising:
a physical surface modification;
an adhesive layer in contact with said physical surface modification;
a polymer layer reversibly coupled to said adhesive layer;
an electrical circuit coupled to said physical surface modification and configured to provide a thermal response to said physical surface modification, said polymer layer, or said adhesive layer, such that upon interaction with an external stimulus at least a portion of said adhesive layer is irreversibly coupled to said physical surface modification in the activated state.

22. The optical data storage article of claim 21, wherein said physical surface modification is in operative association with one or more of a transparent conductive material, radio frequency circuitry, and a wirelessly powered flexible tag.

23. The optical data storage article of claim 22, wherein said wirelessly powered flexible tag comprises an adhesive coupling layer.

24. The optical data storage article of claim 23, wherein said wirelessly powered flexible tag further comprises electrical circuitry.

25. The optical data storage article of claim 24, wherein said electrical circuitry comprises radio frequency circuitry.

26. The optical data storage article of claim 25, wherein said electrical circuitry further comprises a thermocouple, a light-emitting diode, a strain gauge, a sound detecting element, a diode, an antenna, a dipole, an electrical receiver, a photocell, a resistor, a capacitor, a rectifier, an integrated circuit, a surface mount resistor, a chip resistor, an electrode, a heating element, or any combination or multiple thereof.

27. The optical data storage article of claim 26, wherein said heating element comprises titanium, copper, nickel, gold, tantalum-nitride, aluminum, molybdenum, titanium-tungsten, chrome, platinum, nichrome, indium tin oxide and any combinations or alloys thereof.

28. The optical data storage article of claim 21, wherein said adhesive layer comprises a pressure-sensitive adhesive, a water soluble adhesive, an acrylate-based adhesive, a silicone-based adhesive, an elastomer-based adhesive, an epoxy-based adhesive, a thermoset adhesive, an acrylate-based adhesive, or any combination thereof.

29. The optical data storage article of claim 21, wherein said adhesive layer comprises a patterned surface.

30. The optical data storage article of claim 21, wherein said optical article comprises an optical data layer for storing data, wherein at least a portion of said optical data layer comprises a tailored menu, wherein said tailored menu renders the optical data storage article un-readable in said pre-activated state of functionality.

* * * * *

UNITED STATES PATENT AND TRADEMARK OFFICE
CERTIFICATE OF CORRECTION

PATENT NO. : 7,802,274 B2
APPLICATION NO. : 11/611368
DATED : September 21, 2010
INVENTOR(S) : Wisnudel et al.

It is certified that error appears in the above-identified patent and that said Letters Patent is hereby corrected as shown below:

In Column 9, Line 52, delete "terapthalate," and insert -- terephthalate, --, therefor.

In Column 18, Lines 50-51, in Claim 9, after "a thermoset adhesive," delete "an acrylate-based adhesive,".

In Column 20, Lines 32-33, in Claim 28, after "a thermoset adhesive," delete "an acrylate-based adhesive,".

Signed and Sealed this

Twenty-third Day of November, 2010

David J. Kappos
*Director of the United States Patent and Trademark Office*